US007979448B2

(12) United States Patent
Aschen et al.

(10) Patent No.: US 7,979,448 B2
(45) Date of Patent: *Jul. 12, 2011

(54) MAIL AND CALENDAR TOOL AND METHOD

(75) Inventors: Sean E. Aschen, West Haven, CT (US); James R. Doran, New Milford, CT (US); Brian P. Olore, Monroe, NY (US); Joseph Rudmann, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 2122 days.

This patent is subject to a terminal disclaimer.

(21) Appl. No.: 10/604,000

(22) Filed: Jun. 25, 2003

(65) Prior Publication Data

US 2004/0267763 A1    Dec. 30, 2004

(51) Int. Cl.
G06F 17/30 (2006.01)
G06F 7/00 (2006.01)
(52) U.S. Cl. .................. 707/755; 707/756; 707/770
(58) Field of Classification Search ............... 707/1–10, 707/755, 756, 770; 709/100–253
See application file for complete search history.

(56) References Cited

U.S. PATENT DOCUMENTS

| | | | | |
|---|---|---|---|---|
| 5,913,033 | A * | 6/1999 | Grout | 709/219 |
| 6,424,995 | B1 * | 7/2002 | Shuman | 709/206 |
| 6,859,213 | B1 * | 2/2005 | Carter | 715/752 |
| 7,454,462 | B2 | 11/2008 | Belfiore et al. | |
| 2002/0091782 | A1 * | 7/2002 | Benninghoff, III | 709/206 |
| 2002/0133633 | A1 * | 9/2002 | Kumar | 709/310 |
| 2003/0120737 | A1 * | 6/2003 | Lytle et al. | 709/206 |
| 2003/0131142 | A1 | 7/2003 | Horvitz et al. | |
| 2004/0183830 | A1 * | 9/2004 | Cody et al. | 345/752 |
| 2005/0114671 | A1 * | 5/2005 | Little et al. | 713/182 |
| 2005/0246415 | A1 | 11/2005 | Belfiore et al. | |

OTHER PUBLICATIONS

"IBM e server iSeries Dedicated Server for Domino—Enhanced for Collaborative Commerse," IBM Hardware Announcement and Supplemental Information, Apr. 23, 2001, 7 pages.
"Extensible Markup Language (XML) 1.0 (Second Edition)" W3C standard, Oct. 6, 2000, 58 pages.
"Simple Object Access Protocol (SOAP) 1.1" W3C standard, May 8, 2000, 35 pages.
"Multipurpose Internet Mail Extensions (MIME) Part One: Format of Internet Message Bodies," Published by the Internet Society (ISOC), Reston, VA, Nov. 1996, 29 pages.
Non-final Office Action mailed Dec. 29, 2005 for US Patent No. 7266557.
Final Office Action mailed May 31, 2006 for US Patent No. 7266557.
Notice of Allowance mailed May 4, 2007 for US Patent No. 7266557.

* cited by examiner

*Primary Examiner* — Tim T. Vo
*Assistant Examiner* — Sangwoo Ahn
(74) *Attorney, Agent, or Firm* — John Pivnichny

(57) ABSTRACT

Access to data in a file created by a mail and calendaring client application is provided to other applications without the need for use of the mail and calendaring client. A request is received from the other application for a document in the file. The document is retrieved in XML form. Sections are expanded by creating URLs and inserting these into the retrieved document. Content of sections is then retrieved in HTML form from the file and inserted into the document at the location of the corresponding URLs. Data for attachments, image tags and other links is obtained and inserted into the document. An object is created containing the entire expanded document and sent to the requesting application.

20 Claims, 2 Drawing Sheets

MAIL AND CALENDAR TOOL AND METHOD

CROSS REFERENCE TO RELATED APPLICATION

This application is related to an application titled "FILE RETRIEVAL METHOD AND SYSTEM" having common inventors and a common assignee. Both applications are filed on the same date.

TECHNICAL FIELD

The invention relates to providing mail and calendaring data stored in a database by a first application to other applications. More particularly the invention relates to providing such data from a database residing on a server to applications residing on other servers or client computers. Even more particularly, such data is provided to the other applications without the need or use of the first application.

BACKGROUND OF THE INVENTION

Various systems and applications have been developed to provide electronic mail (e-mail) and calendar maintenance functions to users. Some systems make use of an application running on a user workstation, such as OUTLOOK EXPRESS® available from Microsoft Corp. (OUTLOOK EXPRESS is a trademark of Microsoft Corp. of Redmond, Wash.). The application retrieves incoming e-mail through an internet connection and displays a list of incoming notes. The user may select one or more notes to read, delete, save, or forward to another user. Similarly the application allows a user to compose an outgoing e-mail note and send it through the same internet connection. Copies of the incoming and outgoing notes may generally be saved on either the user's workstation, or on a server supporting the internet connection, or both.

Other systems use an ordinary internet browser running on a user workstation to provide similar functions. Still others may use an ordinary browser with some modification to facilitate e-mail and calendar maintenance (calendaring) functions.

Some applications are specifically developed to provide e-mail and calendaring for numerous employees in a company. LOTUS NOTES® available from International Business Machines Corp. (LOTUS NOTES is a trademark of International Business Machines Corp.) is one example of such an application. The individual notes and calendar entries are stored in a database running on a server such as the DOMINO® server software (DOMINO is a trademark of International Business Machines Corp.) a copy or replica of the stored notes and calendar entries may also be kept on a user's workstation to permit standalone operation, for example when the connection to the server, or the server itself is unavailable due to overload or breakdown.

Some of the information contained in these notes and calendar entries may be extremely valuable, particularly in the case of a large company where critical business information may be held by numerous employees at various locations. Other business applications may benefit from having access to the information kept in this server database, however no means is readily available to provide such access without extensive coding effort by the developers of the other application. For example, a note or calendar entry document may have sections, attachments, image tags, and links to other items in the document. Ordinary document retrieval using a browser will not make these sections, attachments, images, or links usable to the application using a browser for retrieval.

It would therefore be a significant accomplishment if a system or method were developed to easily provide such information to other applications. Furthermore, other applications may be running on computer systems which do not have the first application installed or available for use. It would therefore be a desirable feature to provide such information without making use of the first application. It is believed that this would constitute a significant advancement in the e-mail and calendaring arts.

OBJECTS AND SUMMARY OF THE INVENTION

It is therefore a principal object of the present invention to enhance the mail and calendaring data art by providing a method of access with enhanced capability.

It is another object to provide a system with such enhanced capability.

These and other objects are attained in accordance with one embodiment of the invention wherein there is provided a method of providing data to an application, comprising the steps of, providing a mailfile of documents having a section and fields, receiving a request from an application for one of the documents, retrieving the fields of the one of the documents from the mailfile, in response to the fields, retrieving the one of the documents as a markup language document, inserting a URL into the markup language document to retrieve the section of the one of the documents, retrieving the section from the mailfile in the markup language, removing the URL from the retrieved document and creating an object having the section expanded in the retrieved document, and sending the object to the application.

In accordance with another embodiment of the invention there is provided, a system for providing data stored in a mailfile to an application, comprising a mailfile having data stored as documents with sections, a database for passing a request for one of the documents to the mailfile and upon return converting the one of the documents into an extended markup format, an authentication directory having authentication records for an application, and mail and calendaring web service software for receiving a request from an application for a document, receiving text files in an extended markup format from the database, accessing binary data from the mailfile, creating an object comprising the converted document with the binary data inserted, authenticating the application using the directory, and sending said object to the application.

BEST MODE FOR CARRYING OUT THE INVENTION

For a better understanding of the present invention, together with other and further objects, advantages and capabilities thereof, reference is made to the following disclosure and the appended claims in connection with the above-described drawings.

Figure 1:
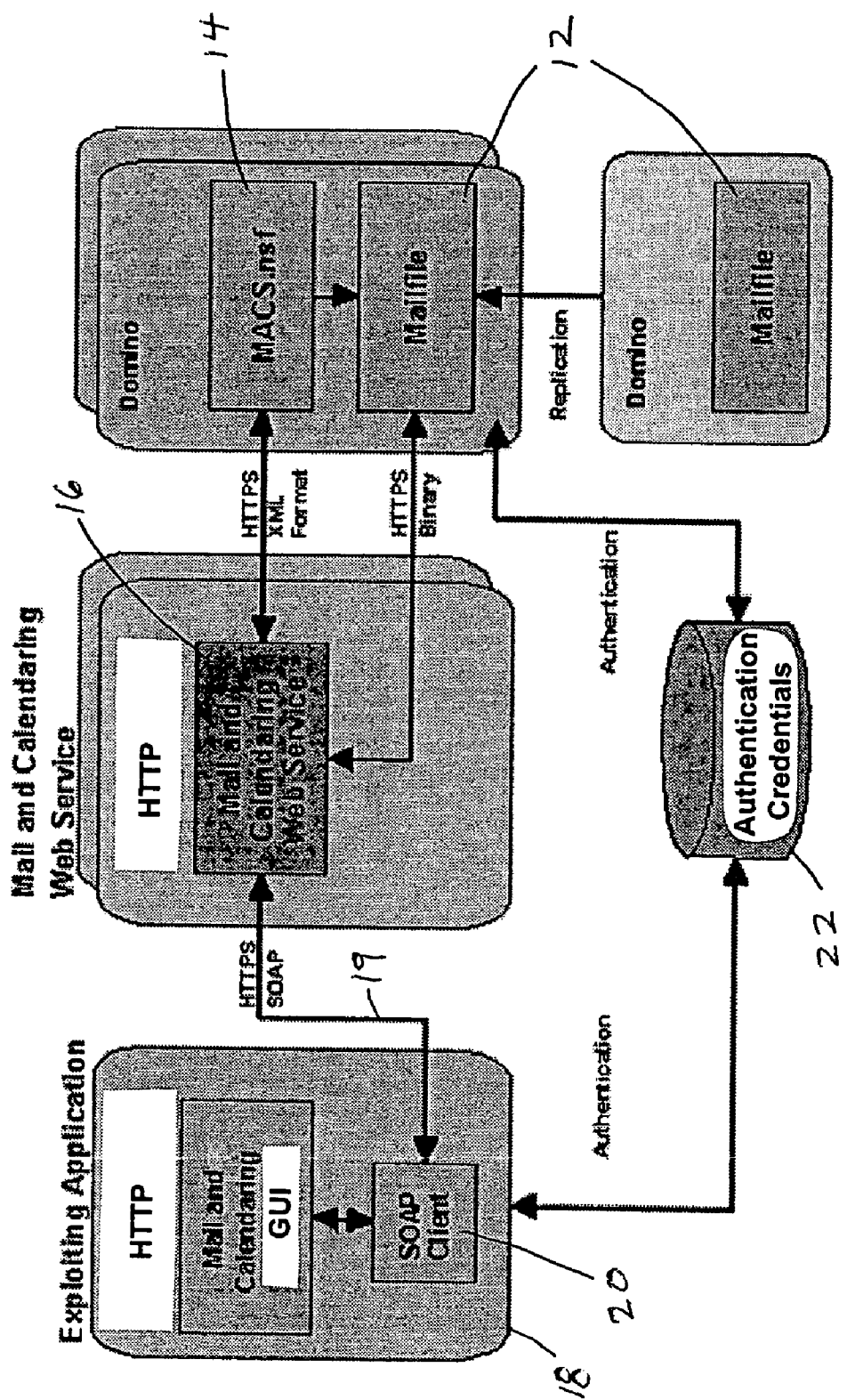
FIG. 1 depicts a mail and calendaring system.

In FIG. 1 there is shown elements of a system for providing mail and calendaring data stored in mailfile 12 to application 18 in accordance with the present invention. Mailfile 12 contains documents stored by a mail and calendaring client (not shown). For example, a client mail and calendaring program product such as LOTUS NOTES may store each e-mail note or calendar entry for a user as a document in mailfile 12. Understandably mailfile 12 may be very large containing thousands or millions of documents, particularly if many employees in a large company share a mailfile. The documents have fields and at least one section. The document may also have attachments, images, links, and embedded objects. A section is defined as additional data which may be hidden or visible when the document is viewed. For example, the document may have a subtitle, category, or other term with an expansion button nearby. A triangle shaped "twistee" button or any other type of expansion control may be used. When the expansion control is activated, such as by clicking a mouse pointer on a twistee, the additional data is either exposed or hidden from view.

The document may also include an attachment link to an attachment stored in mailfile 12, or stored elsewhere on the same server where mailfile 12 is located, or stored elsewhere in a network.

The document may also include an image tag. The image itself may also be stored elsewhere. Any format of image data whether coded or uncoded may be used such as joint photographics experts group (JPEG or .JPG), bitmap (BMP), graphics interchange (.GIF) or any other image format. The document may also include links to other documents, images or attachments. The link may point to information stored elsewhere.

Application 18 requests access to a document stored in mailfile 12. The request is sent to mail and calendaring web service software 16 over communication link 19. Any type of communication protocol may be used for sending and receiving the request including hypertext transfer protocol (HTTP), or HTTP secure (HTTPS) either alone or as a carrier for a simple object access protocol (SOAP) message. Application 18 may include a client 20 for handling a SOAP message.

Authentication records for application 18 are stored in enterprise directory 22 which may be any type of directory such as a DOMINO directory or an LDAP (Lightweight Directory Access Protocol) directory or any other type of directory known in the art. Directory 22 may also be a password file or a credential vault.

Database 14 is shown in FIG. 1 as residing on the same server as mailfile 12, however this may be a replica mailfile as shown. For example, mailfile 12 and database 14 may reside on a DOMINO server. Database 14 has a capability of passing a request for a document to mailfile 12. When the document is returned, database 14 converts the documents into an extended markup format such as XML.

Mail and calendaring web service software (MACS) 16 receives the document request from application 18 over communication link 19. MACS retrieves the document from mailfile 12 in accordance with the retrieval flowchart of FIG. 2.

Figure 2:
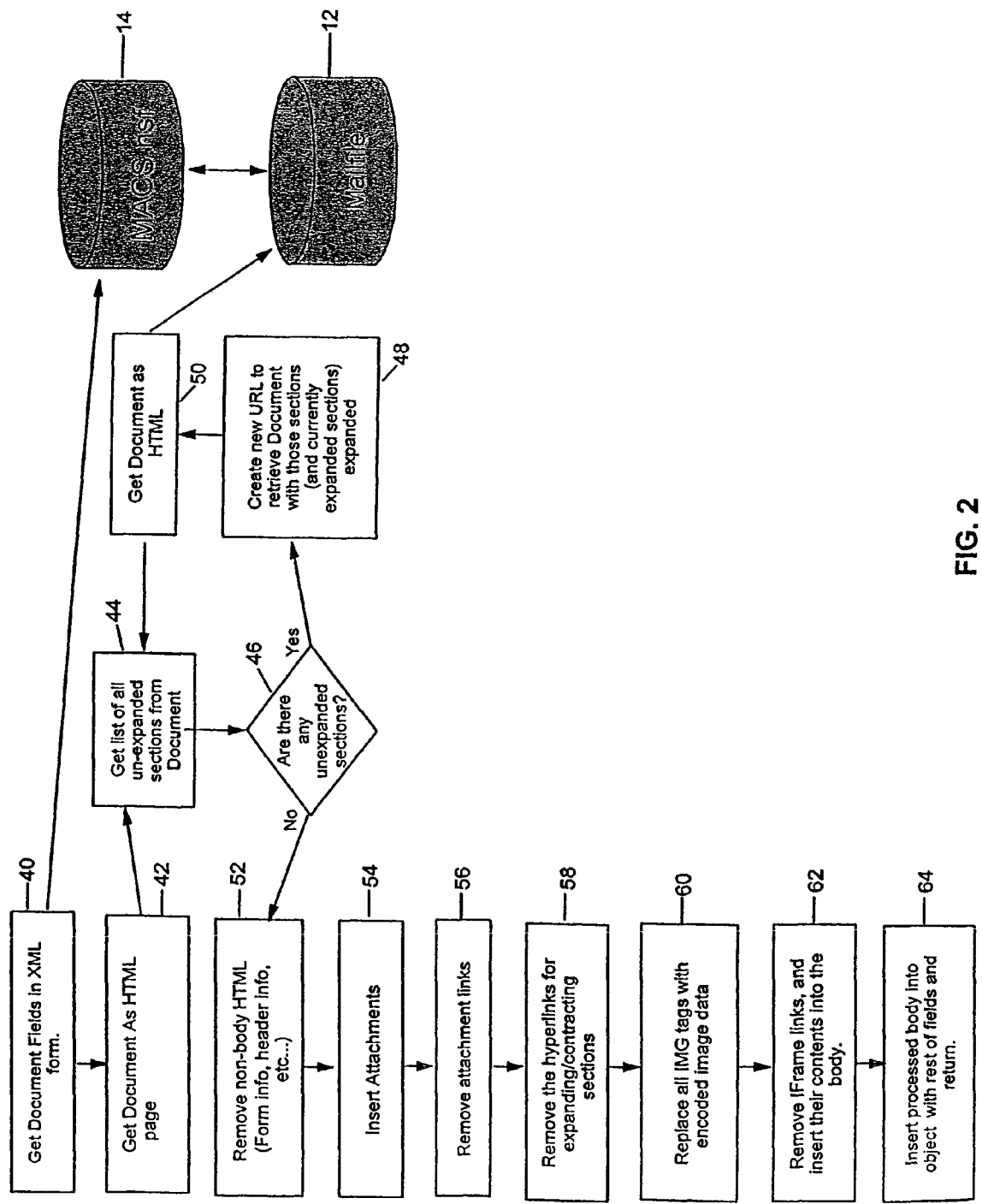
FIG. 2 is a document retrieval flowchart.

In step 40 of FIG. 2 the document fields are retrieved from mailfile 12 through use of database 14. Fields of the document are retrieved in XML format. However, as noted above, the document may have unexpanded sections which are not visible to the requesting application. Consequently loop steps 44, 46, 48, and 50 access mail database 12 to obtain the sections and insert these into the retrieved document. A URL for each section is created and inserted in the retrieval document so the section can be obtained, for example with an HTML Get request from mailfile 12. The sections are inserted in the retrieval document at the appropriate point. Later, in step 58 these URL's are removed when no longer needed.

Non-body HTML statements such as header, are removed in step 52.

In steps 54 and 56, attachments are obtained and inserted by MACS 16 in place of attachment links in the document. In step 60 images are obtained and inserted in the document in response to image tags. The image data so obtained may need to be encoded in a format compatible with the markup language e.g. XML, HTML used for the text portion of the document and any restriction imposed by the transmission protocol. One such compatible encoding, known as Base 64 as defined in section 6.8 (page 23) of the MIME part 1 document may be used. Other encodings may also be used.

In step 62 links in the retrieved document are removed by MACS 16 and the content is inserted into the document.

In step 64 an XML object of the entire document is created by MACS 16.

Returning now to FIG. 1, mailfile 12 and database 14 have access to enterprise directory 22 as shown. Whenever data is retrieved from mailfile 12, or a request is sent to database 14 to retrieve document fields, for the purpose of satisfying a request from application 18, an authentication is performed using the records stored in authentication directory 22.

XML object of step 64 is then returned to requesting application 18 over communication link 19. Any communication protocol may be used including HTTP alone, secure, or as a carrier to a SOAP message.

While there have been shown and described what are at present considered the preferred embodiments of the invention, it will be obvious to those skilled in the art that various changes and modifications may be made therein without departing from the scope of the invention as defined by the appended claims.

What is claimed is:

1. A method of providing data to an application, comprising the steps of:
    providing a mailfile stored on a server, of documents having a section and fields;
    receiving a request from an application running on a user workstation different from said server, for one of said documents;
    retrieving said fields of said one of said documents from said mailfile;
    in response to said fields, retrieving said one of said documents as a markup language document;
    inserting at said server, a URL into said markup language document to retrieve said section of said one of said documents;
    retrieving at said server, said section from said mailfile in said markup language;
    removing at said server, said URL from the retrieved document and creating an object having said section expanded in the retrieved document; and
    sending said object to said application.

2. The method of claim 1, wherein said fields are retrieved as an XML document.

3. The method of claim 1, wherein said markup language is HTML.

4. The method of claim 1, wherein said one of said documents has a file attachment link.

5. The method of claim 4, further comprising the steps of retrieving said attachment, removing said link, and inserting said attachment into said object.

6. The method of claim 1, wherein said one of said documents has an image tag.

7. The method of claim 6, further comprising the steps of retrieving the image of said image tag, encoding said image, and inserting the encoded image in place of said image tag in the retrieved document.

8. The method of claim 1, wherein said one of said documents has a link to other items in said document.

9. The method of claim 8, further comprising the steps of retrieving the content of said link, and inserting said content in the retrieved document at the position of said link.

10. A system for providing data stored in a mailfile to an application, comprising:
- a mailfile stored on a server, having data stored as documents with sections;
- a database for passing a request from an application running on a user workstation, for one of said documents to said mailfile and upon return of said one of said documents, converting said one of said documents into an extended markup format;
- an authentication directory having authentication records for an application; and
- mail and calendaring web service software running on a server different from said workstation, for receiving said request from said application for a document, receiving text files in an extended markup format from said database, accessing binary data from said mailfile, creating an object comprising the converted document with said binary data inserted, authenticating said application using said directory, and sending said object to said application.

11. The system of claim 10, wherein said database and said software run on different servers.

12. The system of claim 10, wherein said extended markup format is XML.

13. The system of claim 10, wherein said software is adapted to operate without the need of a mail or calendaring client.

14. The system of claim 10, wherein said software is adapted to retrieve said sections of said document from said mailfile.

15. The system of claim 10, wherein said binary data is an image file.

16. A computer system for exposing a mail and calendaring document to an application, said system comprising:
- means for storing on a server, mail and calendaring documents having a section and fields, in a mailfile;
- means for receiving a request from an application running on a user workstation, for one of said documents;
- means for retrieving said fields of said one of said documents form said mailfile as an extended markup language document;
- inserting at said server, a URL into said extended markup language document to retrieve said section of said one of said documents;
- retrieving at said server, said section from said mailfile in a second markup language;
- removing at said server, said URL from the retrieved document and creating an object having said section expanded in the retrieved document; and
- sending said object to said application.

17. The computer system of claim 16, wherein said extended markup language is XML.

18. The computer system of claim 17, wherein said second markup language is HTML.

19. A computer program product for instructing a processor to provide mail and calendaring data to an application, said computer program product comprising:
- a computer readable medium;
- first program instruction means for retrieving fields in an extended markup language, of a document having a section, in a mailfile stored on a server, in response to a request from an application running on a user workstation;
- second program instruction means for inserting at said server, a URL into said document to retrieve said section of said document;
- third program instruction means for retrieving at said server, said section from said mailfile in a second markup language;
- fourth program instruction means for removing at said server, said URL from the retrieved document and creating an object having said section expanded in the retrieved document; and
- fifth program instruction means for sending said object to said application; and wherein
- all said program instruction means are recorded on said medium.

20. The computer program product of claim 19, wherein said extended markup language is XML.

* * * * *